(12) United States Patent  
Corry et al.

(10) Patent No.: US 9,011,559 B2
(45) Date of Patent: Apr. 21, 2015

(54) SCRUBBER ASSEMBLY WITH GUIDE VANES

(75) Inventors: Judeth B. Corry, Manvel, TX (US); Richard L. Zhao, Chicago, IL (US)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 13/220,741

(22) Filed: Aug. 30, 2011

(65) Prior Publication Data

US 2013/0047510 A1    Feb. 28, 2013

(51) Int. Cl.
*B01J 7/00* (2006.01)
*C01B 3/36* (2006.01)
*C10K 1/02* (2006.01)
*B01J 4/00* (2006.01)
*C10J 3/84* (2006.01)
*C10K 1/08* (2006.01)
*C10K 1/10* (2006.01)
*B01D 53/26* (2006.01)

(52) U.S. Cl.
CPC . *C10K 1/02* (2013.01); *B01J 4/004* (2013.01); *B01J 4/005* (2013.01); *C10J 3/84* (2013.01); *C10K 1/08* (2013.01); *Y02E 20/18* (2013.01); *Y02E 20/16* (2013.01); *C10K 1/101* (2013.01); *C10J 2300/1653* (2013.01); *C10J 2300/1678* (2013.01); *B01D 53/263* (2013.01)

(58) Field of Classification Search
CPC ............ C10J 3/84; C10J 3/845; C10K 1/022; B01D 17/0211; B01D 45/08; B01D 19/0042; B01D 3/24; B01D 45/16; B01D 4/005
See application file for complete search history.

(56) References Cited

U.S. PATENT DOCUMENTS

| | | | | |
|---|---|---|---|---|
| 4,289,502 A | * | 9/1981 | Muenger et al. | 48/62 R |
| 4,326,856 A | * | 4/1982 | Muenger et al. | 48/197 R |
| 4,328,008 A | * | 5/1982 | Muenger et al. | 48/197 R |
| 4,455,154 A | * | 6/1984 | Blasiole | 48/77 |
| 4,778,483 A | * | 10/1988 | Martin et al. | 48/69 |
| 5,397,381 A | | 3/1995 | Keintzel et al. | |
| 5,425,791 A | * | 6/1995 | Tanca | 48/76 |
| 5,445,658 A | * | 8/1995 | Durrfeld et al. | 48/62 R |
| 6,537,458 B1 | | 3/2003 | Polderman | |
| 7,004,988 B2 | | 2/2006 | Letzel | |
| 7,488,373 B2 | | 2/2009 | Haland et al. | |
| 2003/0000186 A1 | * | 1/2003 | West | 55/459.1 |
| 2009/0041642 A1 | | 2/2009 | Storey et al. | |
| 2009/0180939 A1 | * | 7/2009 | Hagen et al. | 422/194 |

(Continued)

FOREIGN PATENT DOCUMENTS

| | | |
|---|---|---|
| CN | 1048506 A | 1/1991 |
| CN | 2474538 Y | 1/2002 |

(Continued)

OTHER PUBLICATIONS

PCT Search Report and Written Opinion dated Oct. 11, 2012 from corresponding Application No. PCT/US2012/050692.
Chinese Office Action, dated Nov. 3, 2014.

*Primary Examiner* — Imran Akram

(74) *Attorney, Agent, or Firm* — Sutherland Asbill & Brennan LLP

(57) ABSTRACT

The present application provides a scrubber for a gasification system. The scrubber may include a column, an inlet for a flow of dirty syngas, an inlet diffuser system positioned about the inlet, and an outlet for a flow of cleaned syngas.

16 Claims, 4 Drawing Sheets

(56) References Cited

U.S. PATENT DOCUMENTS

| | | | |
|---|---|---|---|
| 2009/0199474 A1* | 8/2009 | Leininger et al. | 48/69 |
| 2010/0101203 A1 | 4/2010 | Harned et al. | |
| 2010/0236199 A1* | 9/2010 | Yokohama et al. | 55/282 |
| 2010/0263841 A1 | 10/2010 | Corry et al. | |
| 2010/0325954 A1 | 12/2010 | Tiwari et al. | |
| 2010/0325956 A1 | 12/2010 | Dinu et al. | |
| 2010/0325957 A1 | 12/2010 | Klockow et al. | |
| 2011/0016787 A1 | 1/2011 | Dinu et al. | |
| 2011/0067304 A1* | 3/2011 | Klockow et al. | 48/87 |
| 2011/0120009 A1* | 5/2011 | Klockow et al. | 48/87 |
| 2011/0120010 A1 | 5/2011 | Tiwari et al. | |
| 2012/0273175 A1* | 11/2012 | Blanchard et al. | 165/157 |
| 2014/0069087 A1* | 3/2014 | Vanvolsem et al. | 60/319 |

FOREIGN PATENT DOCUMENTS

| | | |
|---|---|---|
| CN | 101505852 A | 10/2007 |
| CN | 101967406 A | 2/2011 |
| DE | 3712007 A1 | 10/1988 |
| DE | 4229895 A1 | 3/1994 |
| DE | 102007001385 A1 | 10/2007 |

* cited by examiner

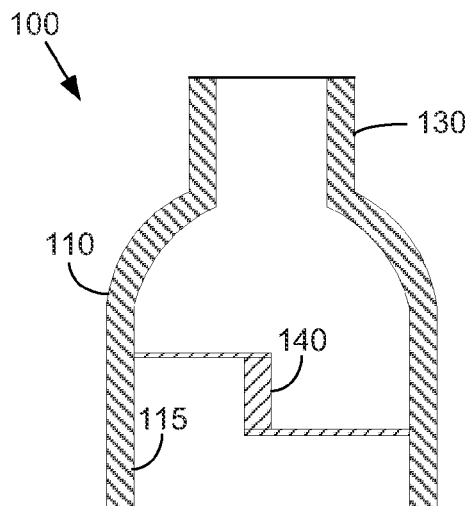
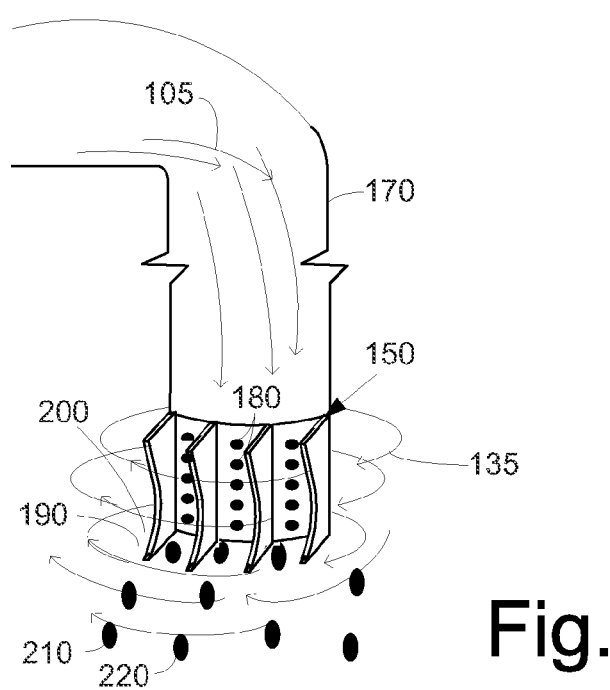
Fig. 3
Fig. 4

SCRUBBER ASSEMBLY WITH GUIDE VANES

TECHNICAL FIELD

The present application and the resultant patent relate generally to gasification systems and more particularly relate to a scrubber assembly with an inlet diffuser for solids and liquids removal.

BACKGROUND OF THE INVENTION

Integrated gasification combined cycled ("IGCC") power plants generate energy from various types of hydrocarbon feedstock such as coal and the like in a relatively clean and efficient manner. Specifically. IGCC technology may convert the hydrocarbon feedstock into a gas mixture of carbon monoxide and hydrogen, known as a "syngas" (synthetic gas), by reaction with steam or water in a gasifier. Following the gasifier, the syngas may be cleaned, processed, and utilized as a fuel in a conventional combined cycle power plant. For example, the syngas may be fed into a combustor of a gas turbine engine and combusted for the generation of electricity or for driving any other type of load. Syngas also may be used in chemical production, in refineries, and elsewhere.

During the gasification process, solid particles may be entrained in the stream of syngas. The subsequent quenching of the hot syngas causes the stream to be saturated with water so as to entrain liquid water droplets therein. Both the entrained solids and the entrained water droplets must be removed before further processing. Traditionally, this removal process has been achieved by a syngas scrubber or separator. The scrubber may be a large pressurized column that may include an inlet, fractionation trays, and a demister. The typical inlet forces the flows through sump water to remove the solids. The gas then may flow through the fractionation trays to provide gas/liquid contacting and to remove solid particles in the liquid phase. Any remaining liquid flow then may r be removed by the demister.

When the flow rates into a syngas scrubber are increased, however, the capacity of the traditional components therein may be reached. As a result, overall efficiency may be decreased and an excessive amount of entrained water may remain in the flow of syngas.

There is thus a desire for an improved scrubber assembly so as to accommodate increased flow rates therethrough without degrading overall efficiency and performance. Preferably such an improved scrubber assembly will maintain or improve overall system efficiency and performance while maintaining a compact vehicle geometry.

SUMMARY OF THE INVENTION

The present application and the resultant patent thus provide a scrubber for a gasification system. The scrubber may include a column, an inlet for a flow of dirty syngas, an inlet diffuser system positioned about the inlet, and an outlet for a flow of cleaned syngas.

The present application and the resultant patent further provide a method of cleaning a flow of dirty syngas in a scrubber. The method may include the steps of flowing the dirty syngas into a column of the scrubber, flowing the dirty syngas into an inlet diffuser with a number of curved guide vanes, forcing the dirty syngas into a circumferential flow within the column, and separating entrained solids and liquids from the dirty syngas under centrifugal force and gravity.

The present application and the resultant patent further provide a scrubber for a gasification system. The scrubber may include a column, an inlet pipe for a flow of dirty syngas, an inlet diffuser system positioned about an end of the inlet pipe, and an outlet for a flow of cleaned syngas. The inlet diffuser system may include a number of curved guide vanes for inducing a circumferential flow in the flow of dirty syngas.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a side plan view of a scrubber assembly as may be described herein.

FIG. 4 is a perspective view of an inlet diffuser as may be used with the scrubber assembly of FIG. 3.

DETAILED DESCRIPTION

Figure 1:
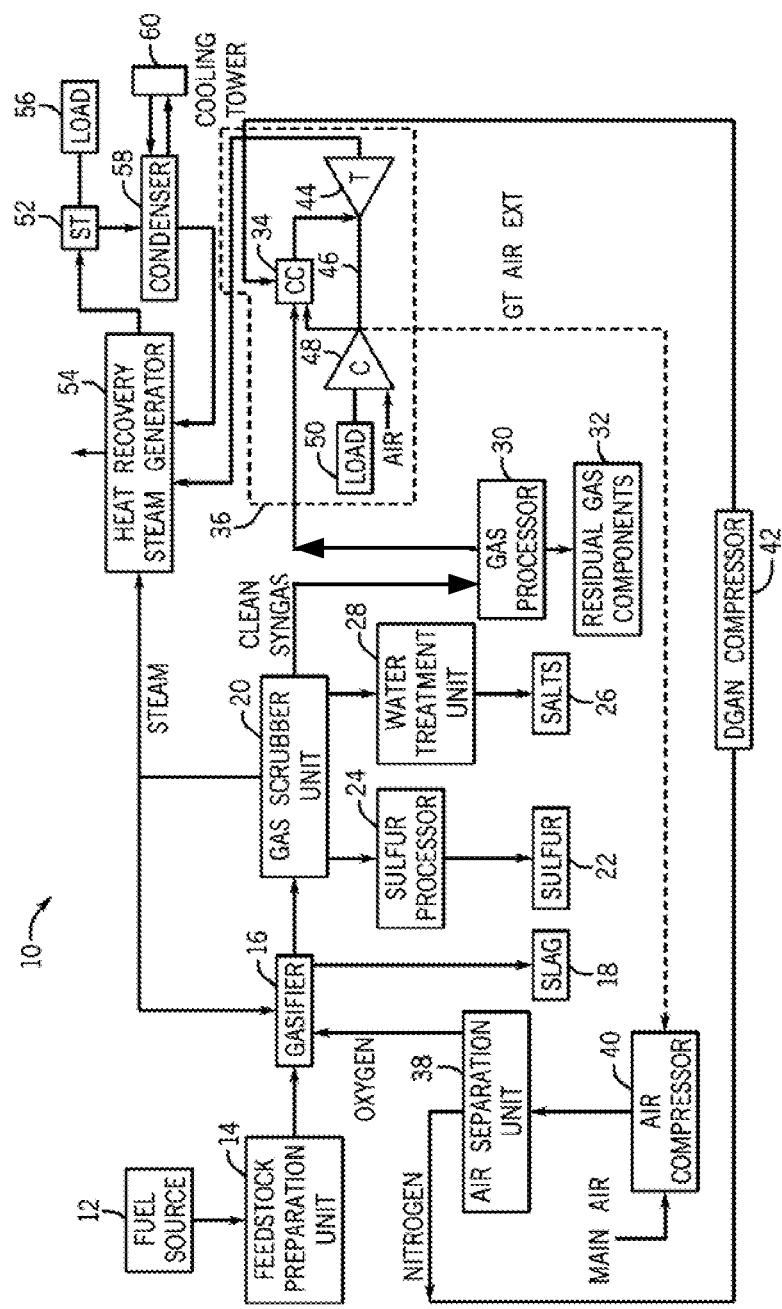
FIG. 1 is a schematic diagram of an integrated gasification combined cycle power plant.

Referring now to the drawing in which like numerals reflect like elements throughout the several views, FIG. 1 shows an example of gasification system 10 such as an integrated gasification combined cycle (IGCC) system that may be powered by syngas. The gasification system 10 may include a fuel source 12, such as a solid fuel, that may be utilized as a source of energy for the gasification system 10. The fuel source 12 may include coal, petroleum coke, biomass, wood-based materials, agricultural wastes, tars, coke oven gas and asphalt, or other carbon containing items.

The solid fuel of the fuel source 12 may be passed to a feedstock preparation unit 14. The feedstock preparation unit 14 may, for example, resize or reshape the fuel source 12 by chopping, milling, shredding, pulverizing, briquetting, or palletizing the fuel source 12 to generate feedstock. Additionally, water, or other suitable liquids, may be added to the fuel source 12 in the feedstock preparation unit 14 to create a slurry feedstock. In other examples, no liquid may added to the fuel source 12 so as to produce a dry feedstock.

The feedstock may be passed to a gasifier 16 from the feedstock preparation unit 14. The gasifier 16 may convert the feedstock into a syngas, e.g., a combination of carbon monoxide and hydrogen. This conversion may be accomplished by subjecting the feedstock to a controlled amount of steam and oxygen at elevated pressures (e.g., from about 400 to about 1300 psia (about 2758 to about 8963 kPa)) and temperatures (e.g., about 2200 to about 2700 degrees Fahrenheit (about 1204 to about 1482 degrees Celsius)), depending on the type of the gasifier 16. The heating of the feedstock during a pyrolysis process may generate a solid (e.g., a char) and residue gases carbon monoxide, hydrogen, and nitrogen).

The combustion reaction in the gasifier 16 may include introducing oxygen to the char and residue gases. In addition, steam, water, and/or another moderator may be introduced into the gasifier 16. The gasifier 16 utilizes the steam, water and/or other modifier with oxygen to allow some of the feedstock to be burned so as to produce carbon dioxide, carbon monoxide, and energy and to drive a second reaction that converts further feedstock to hydrogen and additional carbon dioxide.

In this way, a resultant gas may be manufactured by the gasifier 16. For example, the resultant gas (syngas) may include approximately seventy-five to eighty-five percent (75%-85%) of carbon monoxide and hydrogen, as well as $CH_4$, HCl, HF, COS, $NH_3$, HCN, and $H_2S$ (based on the sulfur content of the feedstock). The syngas composition, however, may vary within wide ranges, depending on the feedstock used and/or the specific gasification application. The resultant gas may be termed "dirty syngas." The gasifier 16 also may generate by-products, such as slag 18, which may be a wet ash material. As described in greater detail below, a gas scrubber unit 20 may be utilized to clean the dirty syngas (syngas with fine solid particles). The gas scrubber unit 20 may scrub the dirty syngas to remove the fine solids from the dirty syngas. Subsequently, a syngas may be generated from the gas scrubber unit 20 with low solids concentration. Likewise, the liquid water in the syngas also will be at a low concentration.

A gas processor 30 typically may be utilized to remove residual gas components 32 from the clean(ed) syngas, such as sulfur and other residual chemicals. Removal of the residual gas components 32 from the clean syngas, however, may be optional because the clean syngas may be utilized as a fuel or feed even when containing the residual gas components 32 (e.g., a tail gas). This clean syngas may be directed for additional clean up and/or into a combustor 34 of a gas turbine engine 36 as combustible fuel.

The gasification system 10 may further include an air separation unit (ASU) 38. The ASU 38 may separate air into component gases using, for example, distillation techniques. The ASU 38 may separate oxygen from the air supplied to it from a supplemental air compressor 40 and may transfer the separated oxygen to the gasifier 16. Additionally, the ASU 38 may direct separated nitrogen to a diluent nitrogen (DGAN) compressor 42. The DGAN compressor 42 may compress the nitrogen received from the ASU 38 at least to pressure levels equal to those in the combustor 34 so as to not interfere with proper combustion of the syngas. Thus, once the DGAN compressor 42 has compressed the nitrogen to an adequate level, the DGAN compressor 42 may direct the compressed nitrogen into the combustor 34 of the gas turbine engine 36.

As described above, the compressed nitrogen may be transferred from the DGAN compressor 42 to the combustor 34 of the gas turbine engine 36. The gas turbine engine 36 may include a turbine 44, a drive shaft 46, and a compressor 48, as well as the combustor 34. The combustor 34 may receive fuel, such as the syngas, which may be injected under pressure from a number of fuel nozzles. This fuel may be mixed with compressed air as well as compressed nitrogen from the DGAN compressor 42 and combusted within the combustor 34. This combustion may create hot pressurized exhaust gases.

The combustor 34 may direct the exhaust gases towards an exhaust outlet of the turbine 44. As the exhaust gases from the combustor 34 pass through the turbine 44, the exhaust gases may force turbine Hades in the turbine 44 to rotate the drive shaft 46 along an axis of the gas turbine engine 36. As illustrated, the drive shaft 46 may be connected to various components of the gas turbine engine 36, including the compressor 48.

The drive shaft 46 may connect the turbine 44 to the compressor 48 so as to form a rotor. The compressor 48 may include blades coupled to the drive shaft 46. Thus, rotation of turbine blades in the turbine 44 may cause the drive shaft 46 connecting the turbine 44 to the compressor 48 to rotate the blades within the compressor 48. The rotation of the blades in the compressor 48 causes the compressor 48 to compress air received via an air intake in the compressor 48. The compressed air then may be fed to the combustor 34 and mixed with fuel and compressed nitrogen to allow for higher efficiency combustion. The drive shaft 46 also may be connected to a load 50, which may be a stationary load, such as an electrical generator, for producing electrical power in a power plant. Indeed, the load 50 may be any suitable device that is powered by the rotational output of the gas turbine engine 36.

The gasification system 10 also may include a steam turbine engine 52 and a heat recovery steam generation (HRSG) system 54. The steam turbine engine 52 may drive a second load 56 such as an electrical generator for generating electrical power. However, both the first and the second loads 50, 56 may be other types of loads capable of being driven by the gas turbine engine 36 and the steam turbine engine 52, respectively. In addition, although the gas turbine engine 36 and the steam turbine engine 52 may drive separate loads 50, 56, as shown in the illustrated embodiment, the gas turbine engine 36 and the steam turbine engine 52 also may be utilized in tandem to drive a single load via a single shaft. The specific configuration of the steam turbine engine 52, as well as the gas turbine engine 36, may be implementation-specific and may include any combination of sections and other components.

Heated exhaust gas from the gas turbine engine 36 may be directed into the HRSG 54 and used to heat water and produce steam to power the steam turbine engine 52. Exhaust from the steam turbine engine 52 may be directed into a condenser 58. The condenser 58 may utilize a cooling tower 60 to exchange heated water for chilled water, in particular, the cooling tower 60 may provide cool water to the condenser 58 to aid in condensing the steam directed into the condenser 58 from the steam turbine engine 52. Condensate from the condenser 58 may, in turn, be directed into the HRSG 54. Again, exhaust from the gas turbine engine 36 also may be directed into the HRSG 54 to heat the water from the condenser 58 and to produce steam.

As such, in combined cycle systems such as the gasification system 10, hot exhaust may flow from the gas turbine engine 36 to the HRSG 54, where it may be used to generate high-pressure, high-temperature steam. The steam produced by the HRSG 54 then may be passed through the steam turbine engine 52 for power generation. In addition, the produced steam also may be supplied to any other processes where steam may be used, such as to the gasifier 16. The gas turbine engine 36 generation cycle is often referred to as the "topping cycle," whereas the steam turbine engine 52 generation cycle is often referred to as the "bottoming cycle." By combining these two cycles as illustrated in FIG. 1, the IGCC system 10 may lead to greater efficiencies in both cycles. In particular, exhaust heat from the topping cycle may be captured and used to generate steam for use in the bottoming cycle. It should he noted that the examples disclosed herein also may be utilized in non-IGCC gasification processes, such as methanol, ammonia, or other syngas-related processes.

Figure 2:
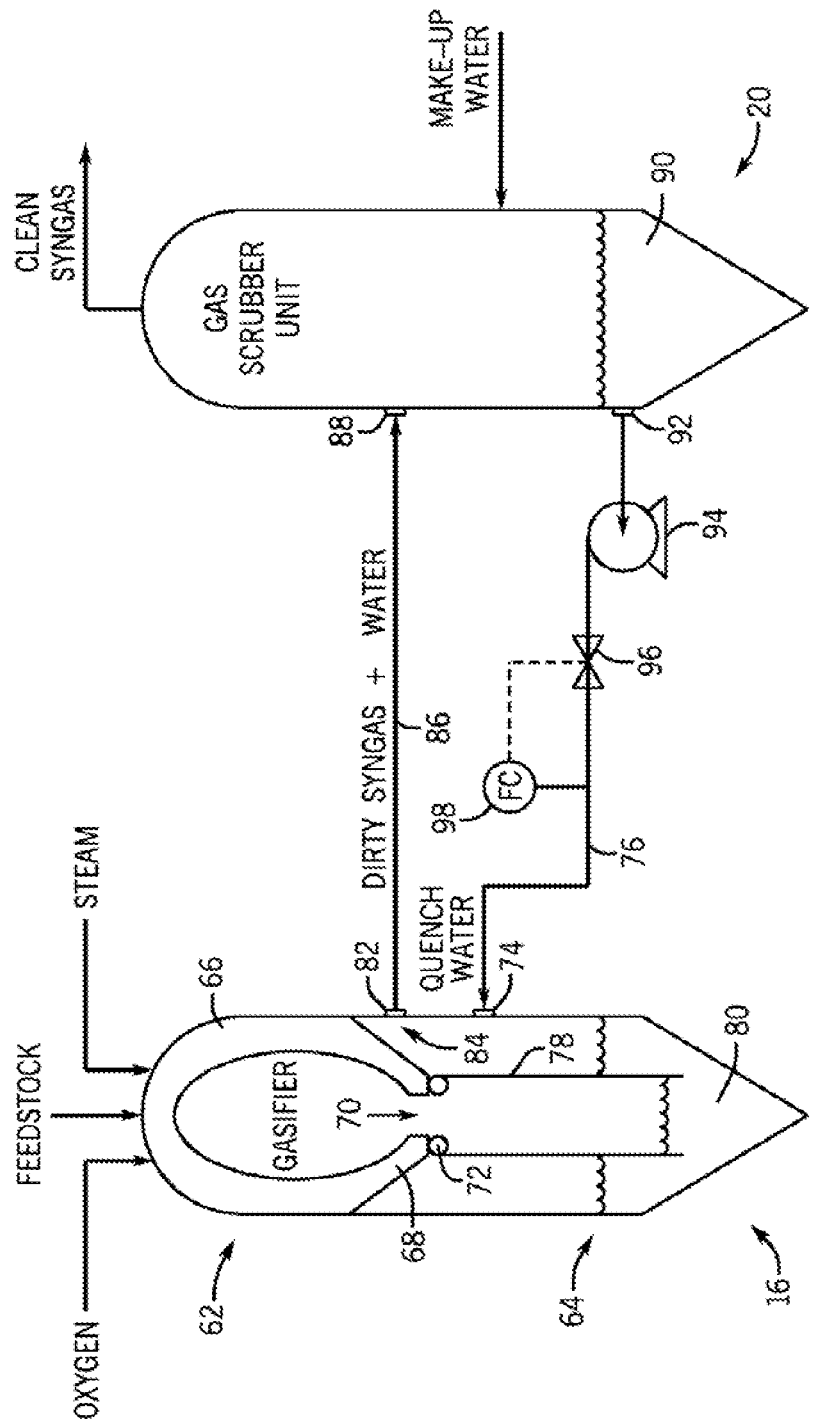
FIG. 2 is a schematic diagram of a gasifier and a scrubber that may be used in the integrated gasification combined cycle power plant of FIG. 1.

As described above, the gas scrubber unit 20 may ensure that the dirty syngas from the gasifier 16 is cleaned (fine solids and liquid water) before sending the syngas to downstream cleanup and final use to make power, chemicals, and/or other use. FIG. 2 is a schematic diagram of an exemplary embodiment of the gasifier 16 and the gas scrubber unit 20 of FIG. 1. As is illustrated, the gasifier 16 may include a reaction chamber 62 and a quench chamber 64. The reaction chamber 62 may be defined by a refractory lining 66. As described above, feedstock (e,g., coal slurry) from the feedstock preparation unit 14, along with oxygen and steam from the ASU 38 and the HRSG 54, respectively, may be introduced into the reaction chamber 62 of the gasifier 16 and converted into dirty syngas. The dirty syngas may include slag, fines, and other contaminants.

The dirty syngas generated within the reaction chamber 62 of the gasifier 16 may be at elevated pressures and temperatures. The high-pressure, high-temperature dirty syngas may enter the quench chamber 64 through a bottom end 68 of the refractory lining 66, as illustrated by arrow 70. In general, the quench chamber 64 may be used to reduce the temperature of the dirty syngas. In certain examples, a quench ring 72 may be located proximate to the bottom end 68 of the refractory lining 66. As illustrated, quench water may be received from a primary water return line 76 through a quench water inlet 74 into the quench chamber 64. In general, the quench water may flow through the quench ring 72 and down a dip tube 78 into a quench chamber sump 80. As such, the quench water may cool the dirty syngas and subsequently exit through a syngas outlet 82 after being cooled, as illustrated by arrow 84. The syngas outlet 82 generally may be located separate from and above the quench chamber sump 80 and may be connected to a syngas transfer line 86 to transfer the dirty syngas into the gas scrubber unit 20 through a syngas inlet 88.

As described above, the gas scrubber unit 20 may be used to clean the dirt syngas by removing solids and entrained water to create "clean" syngas before being directed for further processing and then into the combustor 34 of the gas turbine engine 36 of FIG. 1. More specifically, the gas scrubber unit 20 may scrub the dirty syngas to remove fine solid particles. In addition, the dirty syngas may contain a certain amount of entrained water. The gas scrubber unit 20 also may be used to remove a substantial portion of the remaining entrained water from the dirty syngas. The removed water may collect in a gas scrubber unit sump 90 of the gas scrubber unit 20.

In certain examples, the water collected in the gas scrubber unit sump 90, as well as make-up water into the gas scrubber unit 20, may be used as quench water within the quench chamber 64 of the gasifier 16. In particular, the quench water from the gas scrubber unit 20 may be pumped from a quench water outlet 92 of the gas scrubber unit 20 by a primary water return pump 94. A primary flow control valve 96 may be used to control the flow of the quench water into the quench water inlet 74 through the primary water return line 76. In addition, a primary flow control sensor 98, such as a flow meter, may be used to provide feedback for controlling the primary flow control valve 96. Similar to the syngas outlet 82, the quench water inlet 74 generally may be located separate from and above the quench chamber sump 80 of the gasifier 16 and may direct the flow of quench water into the quench ring 72. Other components and other configurations may be used herein.

FIGS. 3 and 4 show an example of a scrubber assembly 100 as may be described herein. The scrubber assembly 100 may be used in the gasification system 10 described above and the like to clean a flow of the dirty syngas 105. The scrubber assembly 100 may include a pressurized column 110. The pressurized column 110 may be of any size, shape, or configuration. The pressurized column 110 may have an inner wall 115. The pressurized column 110 may have an inlet such as an inlet pipe 120 extending therein. The inlet pipe 120 may be in communication with the syngas transfer line 86 and the gasifier 16 with the flow of the dirty syngas 105 therein. The pressurized column 110 also may have an outlet such as an outlet port 130. The outlet port 130 may be in communication with downstream processing and then the combustor 34 with a flow of substantially clean syngas 135 therein. A demister 140 or a similar structure may be positioned therein. The demister 140 may be in the form of mesh pads, chevron vanes, and the like. Other configurations and other components may be used herein.

The scrubber assembly 100 also may include an inlet diffuser system 150. The inlet diffuser system 150 may be positioned about an end 160 of the inlet pipe 120. In this example, the inlet pipe 120 may have a downward elbow 170 into the column 110. Other shapes, sizes, and configurations may be used herein. The inlet pipe 120 may include a number of apertures 180 positioned about the end 160 thereof for the flow of dirty syngas 105 therethrough.

The inlet diffuser system 150 also may include a number of guide vanes 190 positioned about the apertures 180 at the end 160 of the inlet pipe 120. The guide vanes 190 may have a substantially curved shape 200. This curved shape 200 induces a circumferential flow trajectory into the incoming flow of dirty syngas 105. Specifically, the gas flows tangentially around the column 110 such that centrifugal forces and gravity assist in separating heavier liquid droplets 210 and solid particles 220 from the now clean flow of syngas 135. The guide vanes 190 may have variable lengths, openings, angles, and other configurations such that the flow is uniform from the inlet diffuser 150 and into the column 110. Varying shapes and sizes may be used about the inlet pipe 120. The end 160 of the inlet pipe 120 may include a baffle 225 thereon. The baffle 225 seals the end 160 of the inlet pipe 120 in whole or in part so as to force the incoming flow into the apertures 180 and the guide vanes 190. An additional guide vane also may be positioned about the end 160 of the inlet pipe 120. Other components and other configurations may be used herein.

The inlet diffuser system 150 also may include a water spray outlet 240 positioned about the inner wall 115 of the column 110 so as to wet the inner wall 115. A thin film of water from the water spray outlet 240 on the inner wall 115 may assist in the separation of liquids and solids from the gas given the circumferential flow extending therein. A water pipe 250 also may be positioned about the inlet pipe 120 to provide an optional water spray to contact the solids in the dirty syngas. Other components and other configurations also may be used herein.

Figure 5:
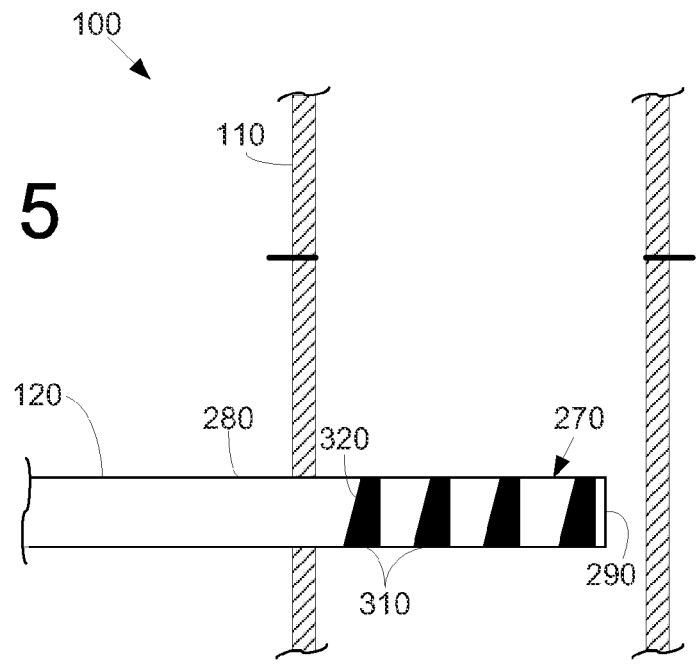
FIG. 5 is a side plan view of an alternative embodiment of a scrubber assembly as may be described herein.
Figure 6:
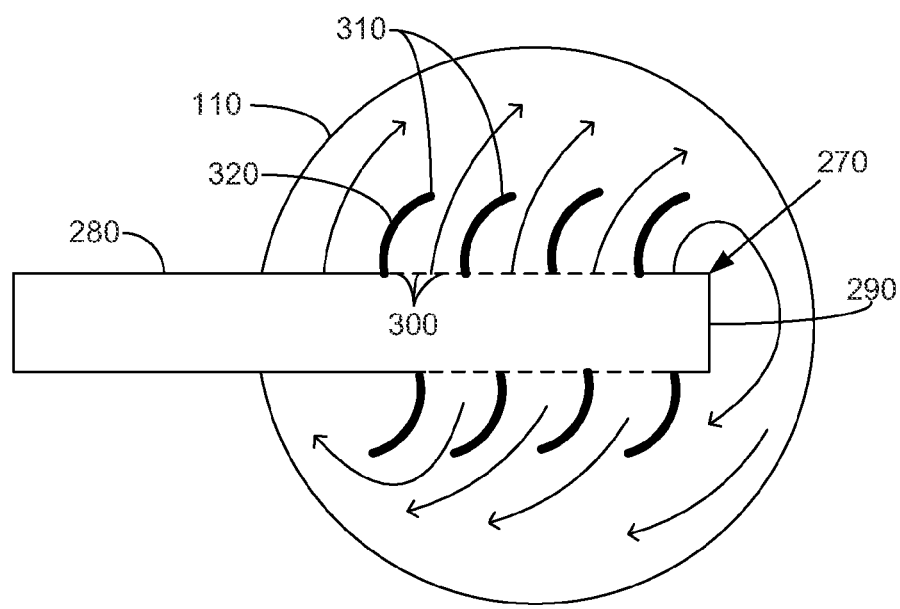
FIG. 6 is a top plan view of an inlet diffuser as may be used with the scrubber assembly of FIG. 5.

FIGS. 5 and 6 show a further embodiment of an inlet diffuser system 270 as may be described herein. In this example, the inlet pipe 120 takes the form of a straight pipe 280. An end 290 of the straight pipe 280 includes a number of apertures 300 therein. The inlet diffuser system 270 further includes a number of guide vanes 310 positioned about the apertures 300. The guide vanes 310 also may have a curved shape 320 so as to induce a circumferential flow trajectory into the incoming flow in a matter similar to that described above. Other components and other configurations may be used herein.

The scrubber assembly 100 with the inlet diffuser systems 150, 270 thus induces a circumferential flow to aid in the removal of solids 220 and liquids 210 entrained in the dirty syngas 105. The inlet diffuse systems 150, 270 may provide performance, reliability, and availability even in response to high incoming syngas flow rates. The inlet diffuser systems 150, 270 may be provided as original equipment or as part of a retrofit. The inlet diffuser systems 150, 270 also may be applied to other processes that have a gas phase entrained with liquids and/or solids so as to separate the gas from the entrained liquids and solids therein in a fast and efficient manner.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A scrubber for a gasification system, comprising:
a pressurized column with a reactor axis;
an inlet pipe positioned within the pressurized column for a flow of dirty syngas;
an inlet diffuser system positioned about an end of the inlet pipe, wherein the inlet diffuser system comprises a plurality of guide vanes that extend circumferentially about the end of the inlet pipe, such that the plurality of guide vanes are positioned perpendicular to an outer surface of the inlet pipe and the plurality of guide vanes are substantially parallel to the reactor axis; and
an outlet for a flow of cleaned syngas, wherein the outlet is in communication with a combustor;
wherein the end of the inlet pipe comprises a plurality of apertures therein;
wherein the plurality of apertures are positioned between a pair of the plurality of guide vanes; and
wherein the inlet is in communication with a gasifier.

2. The scrubber of claim 1, wherein the inlet pipe comprises a downward elbow.

3. The scrubber of claim 1, wherein the inlet pipe comprises a straight pipe.

4. The scrubber of claim 1, wherein the plurality of guide vanes comprise a curved shape.

5. The scrubber of claim 1, wherein the inlet diffuser system comprises a water spray outlet positioned about an inner wall of the column.

6. The scrubber of claim 1, further comprising an additional water pipe positioned about the inlet.

7. The scrubber of claim 1, further comprising a demister within the column.

8. The scrubber of claim 1, wherein the plurality of apertures form an axially aligned column positioned between the pair of the plurality of guide vanes.

9. The scrubber of claim 8, wherein the axially aligned column comprises a first aperture at a first end of one of the plurality of guide vanes and a second aperture at a second end of the one of the plurality of guide vanes.

10. The scrubber of claim 8, wherein the plurality of apertures form axially aligned columns positioned between each pair of the plurality of guide vanes.

11. A method of cleaning a flow of dirty syngas in a scrubber, comprising:
flowing the dirty syngas into a pressurized column of the scrubber via an inlet pipe positioned within the pressurized column;
flowing the dirty syngas into an inlet diffuser positioned about an end of the inlet pipe with a number of curved guide vanes that extend perpendicular to a circumferential outer surface of the inlet diffuser system, such that the plurality of guide vanes are positioned perpendicular to an outer surface of the inlet pipe and the plurality of guide vanes are substantially parallel to a reactor axis of the pressurized column;
forcing the dirty syngas into a circumferential flow within the column; and
separating entrained solids and liquids from the dirty syngas under centrifugal Force;
wherein the end of the inlet pipe comprises a plurality of apertures therein;
wherein the plurality of apertures are positioned between a pair of the plurality of guide vanes; and
wherein the inlet is in communication with a gasifier.

12. A scrubber for a gasification system, comprising:
a pressurized column with a reactor axis;
an inlet pipe for a flow of dirty syngas positioned within the pressurized column;
an inlet diffuser system positioned about an end of the inlet pipe;
wherein the inlet diffuser system comprises a plurality of curved guide vanes for inducing a circumferential flow in the flow of dirty syngas, the plurality of curved guide vanes extending circumferentially about the end of the inlet pipe, such that the plurality of guide vanes are positioned perpendicular to an outer surface of the inlet pipe and the plurality of guide vanes are substantially parallel to the reactor axis; and
an outlet for a flow of cleaned syngas, wherein the outlet is in communication with a combustor;
wherein the end of the inlet pipe comprises a plurality of apertures therein;
wherein the plurality of apertures are positioned between a pair of the plurality of guide vanes; and
wherein the inlet is in communication with a gasifier.

13. The scrubber of claim 12, wherein the inlet pipe comprises a downward elbow.

14. The scrubber of claim 12, wherein the inlet pipe comprises a straight pipe.

15. The scrubber of claim 12, wherein the inlet diffuser system comprises a water spray outlet positioned about an inner wall of the column.

16. The scrubber of claim 12, further comprising an additional water pipe positioned about the inlet pipe.

* * * * *